(12) United States Patent
Gorcic et al.

(10) Patent No.: US 11,447,042 B2
(45) Date of Patent: Sep. 20, 2022

(54) STOP FOR A RAIL OF A LONGITUDINALLY ADJUSTABLE SEAT

(71) Applicant: Adient Luxembourg Holding S.à.r.l., Luxembourg (LU)

(72) Inventors: Sascha Gorcic, Remscheid (DE); Bharath Nagesha Gowda, Leverkusen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 15/749,962

(22) PCT Filed: Aug. 3, 2016

(86) PCT No.: PCT/EP2016/068483
§ 371 (c)(1),
(2) Date: Feb. 2, 2018

(87) PCT Pub. No.: WO2017/021427
PCT Pub. Date: Feb. 9, 2017

(65) Prior Publication Data
US 2018/0229625 A1    Aug. 16, 2018

(30) Foreign Application Priority Data
Aug. 3, 2015   (DE) .................. 10 2015 214 775.4

(51) Int. Cl.
*B60N 2/07* (2006.01)
*B60R 13/02* (2006.01)
*B60N 2/08* (2006.01)

(52) U.S. Cl.
CPC .......... *B60N 2/0727* (2013.01); *B60N 2/073* (2013.01); *B60N 2/0705* (2013.01);
(Continued)

(58) Field of Classification Search
CPC .. B60N 2/0727; B60N 2/0705; B60N 2/0722; B60N 2/0725; B60N 2/073; B60N 2/0818; B60N 2/0715; B60N 2/06; B60N 2/067; B60N 2002/0236; B60R 11/00; B60R 13/0206; B60R 22/22; F16B 2/241; F16B 19/1081; F16B 13/0816; F16B 21/086;
(Continued)

(56) References Cited

U.S. PATENT DOCUMENTS 2,565,636 A * 8/1951 Tinnerman .............. F16B 2/241
                                                        24/336
2,909,957 A * 10/1959 Rapata .................. F16B 21/086
                                                        411/508

(Continued)

FOREIGN PATENT DOCUMENTS

| DE | 198 04 506 A1 | 8/1999 |
| DE | 20 2009 002972 U1 | 7/2009 |
| DE | 10 2008 012213 A1 | 9/2009 |
| DE | 102008062085 A1 * | 6/2010 ........... B60N 2/0727 |

*Primary Examiner* — Jonathan Liu
*Assistant Examiner* — Taylor L Morris
(74) *Attorney, Agent, or Firm* — Marshall & Melhorn, LLC

(57) ABSTRACT

A stop (11, 11'), in particular an abutment for a longitudinal adjustment mechanism, includes a stop element (15, 15') that can be placed in various positions. The stop element is configured to automatically lock into a retaining position.

13 Claims, 10 Drawing Sheets

(52) U.S. Cl.
CPC ........ *B60N 2/0722* (2013.01); *B60R 13/0206* (2013.01); *B60N 2/0806* (2013.01)

(58) Field of Classification Search
CPC ...... F16B 37/043; F16B 13/04; F16B 19/109; F16B 21/065; F16B 21/08; F16B 21/075; F16B 2/24; B64D 11/0696
USPC ...................................................... 297/344.1
See application file for complete search history.

(56) References Cited

U.S. PATENT DOCUMENTS

| | | | | |
|---|---|---|---|---|
| 2,912,734 A * | 11/1959 | Becker | F16B 2/24 | 411/503 |
| 3,078,064 A * | 2/1963 | Turnbull | F16B 19/1081 | 248/239 |
| 3,473,283 A * | 10/1969 | Meyer | F16B 21/073 | 24/295 |
| 3,505,922 A * | 4/1970 | Tinnerman | F16B 37/043 | 411/182 |
| 3,680,272 A * | 8/1972 | Meyer | B60R 13/005 | 24/295 |
| 3,849,838 A * | 11/1974 | Hehl | F16B 2/24 | 24/305 |
| 3,977,725 A * | 8/1976 | Tengler | B60N 2/0715 | 297/468 |
| 4,402,118 A * | 9/1983 | Benedetti | F16B 5/065 | 24/289 |
| 4,478,383 A * | 10/1984 | Urai | B60N 2/0705 | 248/429 |
| 4,495,380 A * | 1/1985 | Ryan | F16B 21/082 | 174/138 D |
| 4,645,394 A * | 2/1987 | While | F16B 39/06 | 411/323 |
| 4,740,026 A * | 4/1988 | Wagner | B60R 13/01 | 296/39.2 |
| 4,811,922 A * | 3/1989 | Yoneyama | H02G 3/26 | 174/72 A |
| 4,898,493 A * | 2/1990 | Blankenburg | F16B 21/088 | 403/326 |
| 4,927,287 A * | 5/1990 | Ohkawa | F16B 21/086 | 24/297 |
| 4,949,931 A * | 8/1990 | Fujiwara | B60N 2/0292 | 248/429 |
| 4,993,678 A * | 2/1991 | Easter | B60N 2/1615 | 248/371 |
| 5,065,490 A * | 11/1991 | Wivagg | G21C 11/08 | 29/402.09 |
| 5,172,882 A * | 12/1992 | Nini | B60N 2/0705 | 248/430 |
| 5,202,172 A * | 4/1993 | Graf | F16B 5/123 | 24/292 |
| 5,246,322 A * | 9/1993 | Salice | F16B 12/14 | 16/383 |
| 5,261,772 A * | 11/1993 | Henninger | F16B 21/06 | 411/61 |
| 5,358,299 A * | 10/1994 | Seto | B60J 3/023 | 296/97.9 |
| 5,401,132 A * | 3/1995 | Akema | F16B 13/061 | 411/21 |
| 5,407,160 A * | 4/1995 | Hollingsworth | A47F 5/0823 | 248/220.43 |
| 5,468,050 A * | 11/1995 | Hall | B60N 2/00 | 297/344.1 |
| 5,513,934 A * | 5/1996 | German | B60R 13/01 | 24/297 |
| 5,524,504 A * | 6/1996 | Brandoli | B60N 2/0705 | 248/429 |
| 5,567,099 A * | 10/1996 | DaFoe | F16B 19/1081 | 411/359 |
| 5,592,720 A * | 1/1997 | Sasakawa | F16B 21/088 | 24/293 |
| 5,605,368 A * | 2/1997 | Noma | B60N 2/06 | 248/430 |
| 5,702,133 A * | 12/1997 | Pavur | B62D 25/24 | 220/795 |
| 5,775,860 A * | 7/1998 | Meyer | F16B 19/1081 | 411/41 |
| 5,800,015 A * | 9/1998 | Tsuchiya | B60N 2/0715 | 248/430 |
| 5,881,982 A * | 3/1999 | Hollingsworth | A47F 5/0823 | 248/220.31 |
| 5,918,847 A * | 7/1999 | Couasnon | B60N 2/0705 | 248/430 |
| 5,931,436 A * | 8/1999 | Rohee | B60N 2/0818 | 248/430 |
| 5,934,729 A * | 8/1999 | Baack | B60R 13/0206 | 296/146.7 |
| 5,961,088 A * | 10/1999 | Chabanne | B60N 2/01525 | 248/429 |
| 5,966,782 A * | 10/1999 | Ishihara | F16B 5/0614 | 24/289 |
| 6,074,150 A * | 6/2000 | Shinozaki | B60R 13/0206 | 24/297 |
| 6,101,686 A * | 8/2000 | Velthoven | F16B 5/065 | 24/289 |
| 6,238,157 B1 * | 5/2001 | Davis, Jr. | B60R 13/0206 | 24/324 |
| 6,253,423 B1 * | 7/2001 | Friedrich | B60R 13/0206 | 24/289 |
| 6,324,732 B1 * | 12/2001 | Arisaka | B60J 3/023 | 24/453 |
| 6,364,272 B1 * | 4/2002 | Schuler | B60N 2/072 | 248/424 |
| 6,398,295 B2 * | 6/2002 | Asai | B60J 3/0221 | 296/146.7 |
| 6,415,478 B1 * | 7/2002 | Watanabe | B60N 3/026 | 16/383 |
| 6,425,557 B1 * | 7/2002 | Becker | B60N 2/06 | 248/157 |
| 6,435,790 B1 * | 8/2002 | Ichikawa | F16B 5/0642 | 24/453 |
| 6,564,433 B2 * | 5/2003 | Nagasawa | B60R 13/04 | 24/289 |
| 6,565,116 B1 * | 5/2003 | Tajima | B60R 13/0206 | 24/297 |
| 6,616,479 B1 * | 9/2003 | Jones | F16B 19/1081 | 411/48 |
| 6,726,418 B2 * | 4/2004 | Dickinson | F16B 37/043 | 411/179 |
| 6,742,753 B2 * | 6/2004 | Klahold | B60N 2/0705 | 248/429 |
| 6,772,985 B2 * | 8/2004 | Lee | B60N 2/071 | 248/424 |
| 6,892,995 B2 * | 5/2005 | Tame | B60N 2/0705 | 248/429 |
| 6,902,235 B2 * | 6/2005 | Rohee | B60N 2/08 | 248/424 |
| 7,086,125 B2 * | 8/2006 | Slobodecki | B60R 13/0206 | 24/295 |
| 7,178,206 B2 * | 2/2007 | Kuhnle | B60R 13/0206 | 24/297 |
| 7,226,023 B2 * | 6/2007 | Banno | F16B 21/088 | 24/297 |
| 7,243,971 B1 * | 7/2007 | McKeoun | B62D 33/037 | 24/563 |
| 7,267,385 B2 * | 9/2007 | Williams | B60R 13/0206 | 296/29 |
| 7,309,107 B2 * | 12/2007 | Smith | B60N 2/0705 | 248/429 |
| 7,407,214 B2 * | 8/2008 | Long | B60N 2/067 | 248/429 |
| 7,444,721 B2 * | 11/2008 | Smith | B60R 13/0206 | 24/297 |
| 7,484,919 B2 * | 2/2009 | Hansen | F16B 19/1081 | 411/41 |
| 7,594,635 B2 * | 9/2009 | Kojima | B60N 2/0722 | 248/429 |

(56) References Cited

U.S. PATENT DOCUMENTS

| | | | | |
|---|---|---|---|---|
| 7,600,809 B2* | 10/2009 | Boggess | B60R 13/0206 | 24/289 |
| 7,607,875 B2* | 10/2009 | Shinozaki | F16B 21/078 | 411/45 |
| 7,637,527 B2* | 12/2009 | Mazanek | B60R 21/04 | 280/728.2 |
| 7,784,159 B2* | 8/2010 | Dickinson | F16B 5/0614 | 24/289 |
| 7,841,817 B2* | 11/2010 | Kawai | F16B 19/1081 | 411/45 |
| 7,891,926 B2* | 2/2011 | Jackson, Jr. | F16B 21/084 | 411/510 |
| 7,992,834 B2* | 8/2011 | Kojima | B60N 2/0727 | 248/424 |
| 7,993,085 B2* | 8/2011 | McClure | F16B 37/043 | 411/55 |
| 8,043,038 B2* | 10/2011 | Sano | F16B 19/1081 | 411/45 |
| 8,051,539 B2* | 11/2011 | Benedetti | B60J 5/0468 | 24/294 |
| 8,191,850 B2* | 6/2012 | Wetzig | B60N 2/0727 | 296/65.01 |
| 8,201,798 B2* | 6/2012 | Nihonmatsu | B60N 2/0705 | 248/430 |
| 8,245,367 B2* | 8/2012 | Kato | F16B 19/1081 | 24/292 |
| 8,282,151 B2* | 10/2012 | Kojima | B60N 2/0727 | 296/65.13 |
| 8,297,646 B2* | 10/2012 | Aoki | B60R 13/0206 | 24/457 |
| 8,474,777 B2* | 7/2013 | Nihonmatsu | B60N 2/0705 | 248/424 |
| 8,490,941 B2* | 7/2013 | Mizuno | B60N 2/0705 | 248/429 |
| 8,534,971 B2* | 9/2013 | Muramatsu | F16B 19/1081 | 411/21 |
| 8,567,017 B2* | 10/2013 | Iwahara | F16B 5/065 | 24/297 |
| 8,591,160 B2* | 11/2013 | Shinozaki | F16B 5/0628 | 24/458 |
| 8,650,722 B2* | 2/2014 | Hosoya | B60R 13/0206 | 24/289 |
| 8,662,807 B2* | 3/2014 | Adachi | F16B 19/1081 | 411/45 |
| 8,669,471 B2* | 3/2014 | Temblador | H02G 3/085 | 174/50 |
| 8,672,601 B2* | 3/2014 | Nitsche | F16B 19/004 | 24/292 |
| 8,678,336 B2* | 3/2014 | Couasnon | B60N 2/0727 | 248/429 |
| 8,695,177 B2* | 4/2014 | Kato | F16B 21/065 | 24/297 |
| 8,695,937 B2* | 4/2014 | Yamada | B60N 2/0727 | 248/429 |
| 8,919,719 B2* | 12/2014 | Nagura | B60N 2/0715 | 296/65.13 |
| 9,021,765 B2* | 5/2015 | Ziehm | B60R 13/0206 | 52/718.06 |
| 9,080,588 B2* | 7/2015 | Diez Herrera | F16B 21/075 | |
| 9,387,779 B2* | 7/2016 | Mischer | B60N 2/0727 | |
| 9,428,226 B2* | 8/2016 | Joyce | B60R 13/0206 | |
| 9,463,716 B2* | 10/2016 | Hayashi | B60N 2/08 | |
| 9,616,777 B2* | 4/2017 | Arakawa | B60N 2/0705 | |
| 10,348,076 B2* | 7/2019 | Gallion | H02G 3/32 | |
| 11,054,032 B2* | 7/2021 | Chlystek | F16J 13/02 | |
| 11,193,517 B2* | 12/2021 | McClure | F16B 5/0258 | |
| 2002/0021950 A1* | 2/2002 | Ichikawa | F16B 5/0642 | 411/349 |
| 2004/0177480 A1* | 9/2004 | Kanie | F16B 19/1081 | 24/297 |
| 2005/0169725 A1* | 8/2005 | Asmuth | F16B 21/02 | 411/44 |
| 2005/0220560 A1* | 10/2005 | Shinozaki | F16B 21/065 | 411/37 |
| 2005/0236861 A1* | 10/2005 | Slobodecki | F16B 37/043 | 296/39.1 |
| 2007/0040404 A1* | 2/2007 | Williams | B60R 13/0206 | 296/39.1 |
| 2007/0125004 A1* | 6/2007 | Conner | B60R 13/04 | 49/502 |
| 2008/0014045 A1* | 1/2008 | Kawai | F16B 19/1081 | 411/45 |
| 2009/0263210 A1* | 10/2009 | Loewe | F16B 19/1081 | 411/553 |
| 2009/0285648 A1* | 11/2009 | Gosis | B60R 21/20 | 411/22 |
| 2010/0090084 A1* | 4/2010 | Moriyama | B60N 2/0725 | 248/430 |
| 2010/0146744 A1* | 6/2010 | Welter | F16B 19/1081 | 24/292 |
| 2010/0207419 A1* | 8/2010 | Kojima | B60N 2/0727 | 296/65.13 |
| 2011/0014005 A1* | 1/2011 | Shinozaki | F16B 21/086 | 411/347 |
| 2011/0101194 A1 | 5/2011 | Wetzig et al. | | |
| 2011/0116890 A1* | 5/2011 | Okada | F16B 5/0642 | 411/358 |
| 2011/0164946 A1* | 7/2011 | Busch | F16B 19/1081 | 411/502 |
| 2011/0225778 A1* | 9/2011 | Lu | B60R 13/0206 | 24/297 |
| 2011/0233365 A1* | 9/2011 | Kato | B60N 2/0702 | 248/429 |
| 2011/0240821 A1 | 10/2011 | Couasnon et al. | | |
| 2011/0253859 A1* | 10/2011 | Ostermeier | F24S 25/634 | 248/223.41 |
| 2012/0132777 A1* | 5/2012 | Nakamura | B60N 2/085 | 248/429 |
| 2012/0256074 A1* | 10/2012 | Garotte | B60N 2/073 | 248/429 |
| 2013/0283576 A1* | 10/2013 | Bozinovski | F16B 5/128 | 24/543 |
| 2013/0285419 A1* | 10/2013 | Lizak | B60R 13/0212 | 296/214 |
| 2014/0017025 A1* | 1/2014 | Hemingway | F16B 1/0014 | 411/15 |
| 2014/0027600 A1* | 1/2014 | Kato | B60N 2/0843 | 248/429 |
| 2014/0042289 A1* | 2/2014 | Kawano | B60N 2/0875 | 248/429 |
| 2014/0138510 A1* | 5/2014 | Yamada | B60N 2/0705 | 248/429 |
| 2014/0191526 A1* | 7/2014 | Lauxen | B60R 13/0206 | 296/1.08 |
| 2014/0224955 A1* | 8/2014 | Nagura | B60N 2/0705 | 248/429 |
| 2014/0317889 A1* | 10/2014 | Hida | B60R 13/04 | 24/293 |
| 2014/0348574 A1* | 11/2014 | Jahner | B60N 2/0705 | 403/106 |
| 2015/0176621 A1* | 6/2015 | Lee | F16B 19/1081 | 411/57.1 |
| 2015/0239368 A1* | 8/2015 | Mischer | B60N 2/0705 | 248/429 |
| 2016/0114740 A1* | 4/2016 | Kwon | B60Q 3/51 | 248/27.3 |
| 2016/0325659 A1* | 11/2016 | Taguchi | B60N 2/5825 | |
| 2016/0339808 A1* | 11/2016 | Mizuno | B60N 2/0843 | |
| 2017/0009789 A1* | 1/2017 | Scherer | F16B 21/086 | |
| 2017/0036567 A1* | 2/2017 | Sato | B60N 2/0705 | |
| 2018/0156256 A1* | 6/2018 | Okumura | F16B 19/004 | |
| 2019/0315290 A1* | 10/2019 | Shinohara | B60R 13/0262 | |

* cited by examiner

STOP FOR A RAIL OF A LONGITUDINALLY ADJUSTABLE SEAT

CROSS REFERENCE TO RELATED APPLICATIONS

This application is a United States National Phase Application of International Application PCT/EP2016/068483, filed Aug. 3, 2016, and claims the benefit of priority under 35 U.S.C. § 119 of German Application 10 2015 214 775.4, filed Aug. 3, 2015, the entire contents of which are incorporated herein by reference.

FIELD OF THE INVENTION

The invention relates to a stop for a rail of a longitudinally displaceable seat, in particular of a vehicle seat, and to a rail for a longitudinal adjuster with such a stop.

BACKGROUND OF THE INVENTION

Stops, in particular end stops for a rail of a longitudinally displaceable seat are known from the prior art, wherein the end stop stops a displacement of the seat or shortens a travel distance.

SUMMARY OF THE INVENTION

It is an object of the present invention to specify a stop, which is improved over the prior art, for a rail of a longitudinally displaceable vehicle seat, and an improved rail with such a stop.

The object is achieved according to the invention with a stop which comprises a stop element which is variably positionable and automatically fixes itself.

For this purpose, the stop element has at least two protruding holding elements, of which one is angled in a hook shaped manner and the other is of pin shaped design. The stop element is therefore positionable in and pluggable into a rail by means of a fixing and plug in connection. For the fixing of the plug in connection, in particular the pin shaped holding element, a flexible fixing element, in particular a holding spring, is provided. The holding spring is configured as an omega spring. Alternatively, the pin shaped holding element can be configured such that the latter fixes itself with a form fit and/or force fit connection. For this purpose, the pin shaped holding element is formed, for example, from a flexible material or is of flexible and profiled design at least on the outer side, and therefore a plug in and clamping connection is made possible.

The advantages achieved with the invention consist in particular in that a stop is configured such, when mechanically stressed, for example when a rail part, such as a plate, acts on the stop, a movement is reliably stopped. Furthermore, such a stop can be inserted and fixed variably in the rail. By this means, travel distances of differing length can be set.

The stop is in particular an end stop for a longitudinal adjustment device and comprises a stop element which is variably positionable and is formed in such a manner that it automatically fixes in a holding position.

For this purpose, the stop element, in one possible embodiment, is configured as a positioning and fixing element. In particular, the stop element is configured as a plug in and fixing element. In other words: the stop element is configured, in particular shaped, such that it first of all permits pre positioning and subsequently automatic fixing.

In one possible embodiment, the stop element has at least two protruding holding elements for the positioning, in particular pre positioning, and fixing. In this case, one of the holding elements is of hook shaped design. For example, one of the holding elements protrudes from the stop element, wherein the free protruding end is angled or bent. The other holding element is of pin shaped design. For example, the other holding element protrudes rectilinearly from the stop element in the form of a pin.

In a further embodiment, at least one of the holding elements is of such flexible design that a plug in and clamping connection is made possible. For example the flexible holding element is formed from a flexible material. Alternatively, the flexible holding element can be of flexible design at least on the outer side. For example, the flexible holding element can be formed from two materials, wherein at least the outer layer is formed from a flexible material, in particular a soft material, such as rubber or a plastic. By this means, the holding element can automatically be fixed at a position with a form fit and/or force fit connection.

Furthermore, at least one of the holding elements can be of profiled design on the outer side. Such a profiling improves the automatic fixing of the stop.

In addition, an, in particular separate, fixing element can be provided which is arrangeable with a form fit and/or force fit connection on the stop. By means of the fixing element, the stop can be fixed in addition to the automatic fixing.

In one possible embodiment, the fixing element is configured as a holding spring, in particular an omega spring. Alternatively, the fixing element can be configured as a leaf spring or another suitable element.

In an alternative embodiment, the fixing element is configured as a plug in element which is arrangeable with a form fit and/or force fit connection in the stop element. The installation is thereby simplified.

In addition, the fixing element can be produced simply and cost effectively. For example, the fixing element can be a plastics part, in particular an injection molded part. The fixing element can be formed, for example, from a thermoplastic elastomer, in particular polypropylene or polyethylene. Alternatively, the fixing element can also be a cast part composed of another material.

Furthermore, the fixing element is irreversibly arrangeable on or in the stop element, in particular irreversibly in a recess of the stop element. For example, the fixing element has at least one depression, and the stop element correspondingly has at least one protrusion, or vice versa. In particular, the fixing element has at least one depression, in particular a notch, score or groove, on the outer side, in particular on the end side. The stop element, in particular the recess of the stop element, correspondingly has at least one protrusion, in particular a rib, a web or a saw tooth rib. Alternatively, the fixing element can have a protrusion, and the stop element can correspondingly have a depression. The fixing element can be is configured such that the latter is arrangeable both irreversibly in the stop element and also automatically and irreversibly fixes the stop element in a holding position.

By means of such a fixing element which is held irreversibly in the stop element and automatically and irreversibly holds the stop element in a holding position, a simple stop which can be variably positioned and fixed is provided. In addition, the stop can absorb large forces.

The invention furthermore relates to a longitudinally adjustable pair of rails which comprises at least one stop, as previously described.

The stop is arrangeable here in a variably positionable and automatically fixable manner on a rail of the pair of rails.

Installation is therefore simplified. In addition, such a stop can be simply retrofitted in existing longitudinal adjustment devices having pairs of rails.

In one possible embodiment, the stop forms an end stop. The stop can be arrangeable releasably here in an interior space between the rails of the pair of rails.

For the pre positioning and automatic fixing, at least two holding elements of the stop engage horizontally in the rails. One of the holding elements here can have a longer engagement than the other holding element. By this means, the stop is configured as a combined positioning and fixing element, wherein one of the holding elements serves for the positioning, in particular pre positioning, and the other holding element brings about fixing, in particular automatic fixing.

The invention furthermore relates to at least one longitudinal adjustment device with at least two pairs of rails, of which each pair of rails comprises at least one of the previously described stops.

Exemplary embodiments of the invention are explained in more detail with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
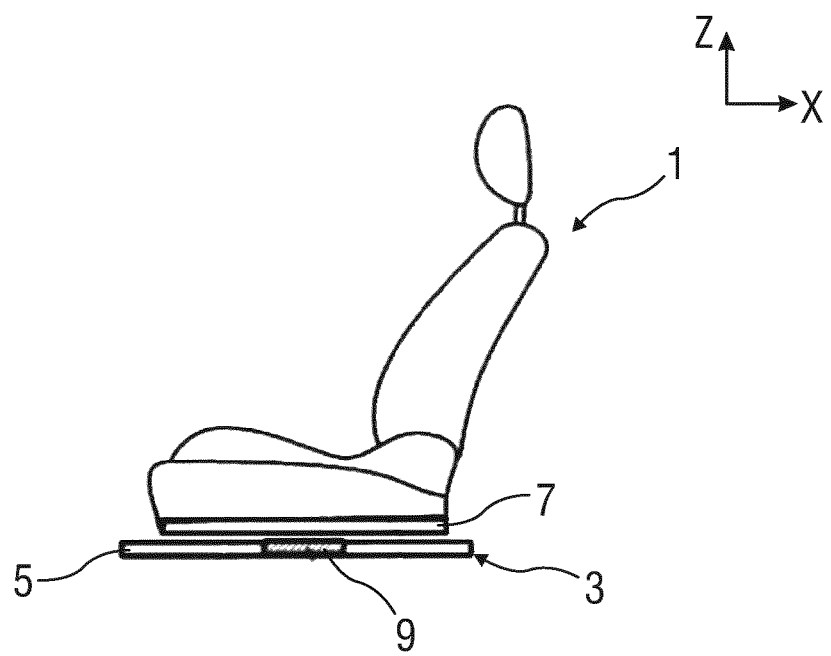
FIG. 1 is a schematic side view of a vehicle seat comprising at least one pair of rails.

Referring to the drawings, mutually corresponding parts are provided with the same reference signs in all of the figures.

FIG. 1 shows in side view one possible exemplary embodiment of a seat configured as a vehicle seat 1, comprising at least one longitudinal adjustment device with a pair of rails 3. The longitudinal adjustment device customarily comprises two pairs of rails 3 which are arranged parallel to each other and are adjusted synchronously in order to adjust the vehicle seat 1. The invention is described in more detail below with reference to one of the pairs of rails 3, wherein the invention is used for both pairs of rails 3.

An arrangement of the vehicle seat 1 in the vehicle is defined here with reference to the system of coordinates used below, comprising a vertical axis Z assigned to a vertical direction of the vehicle, a longitudinal axis X assigned to a longitudinal direction of the vehicle, and a transverse axis Y assigned to a transverse direction of the vehicle.

The pair of rails 3 is provided for the longitudinal displaceability of the vehicle seat 1 and comprises a lower rail 5 and an upper rail 7 which is displaceable in the longitudinal direction in relation to the lower rail 5 and is arranged on the vehicle seat 1.

The lower rail 5 is arranged here fixed to a vehicle structure, for example to a vehicle floor, and, in a predetermined region in the longitudinal direction, has a bearing element 9 supporting the upper rail 7.

The bearing element 9 is, for example, a ball cage which includes a plurality of balls, supports the upper rail 7 by means of the balls and ensures the longitudinal displaceability.

Figure 2:
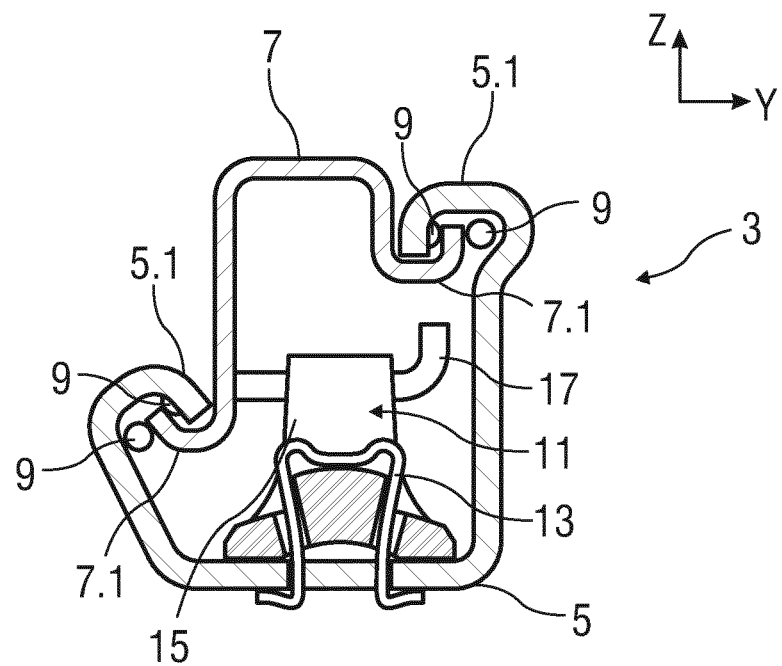
FIG. 2 is a schematic cross sectional view of an exemplary embodiment of a pair of rails with a stop positioned and fixed in a lower rail.

FIG. 2 shows in cross section the pair of rails 3 comprising the lower rail 5, the upper rail 7 and the bearing element 9.

The lower rail 5 comprises, for example, four ball cages which are configured as bearing elements 9 or else are referred to as moving cages, by means of which the upper rail 7 is mounted in a longitudinally displaceable manner on four raceways or supports. Alternatively, other suitable forms or elements can also be used as the bearing elements 9.

The lower rail 5 and the upper rail 7 engage around each other here with their substantially U shaped profiles at longitudinal ends 5.1, 7.1 which are bent inward or outward.

A stop 11 for a pin guiding plate 17 is positioned in the lower rail 5 and is held and fixed on the latter by means of a fixing element 13. The fixing element 13 can optionally be provided here. The stop 11 is configured such that said stop itself is positionable variably on the lower rail 5 and is automatically fixable on the latter.

For this purpose, the stop 11 comprises a stop element 15.

Figure 3:
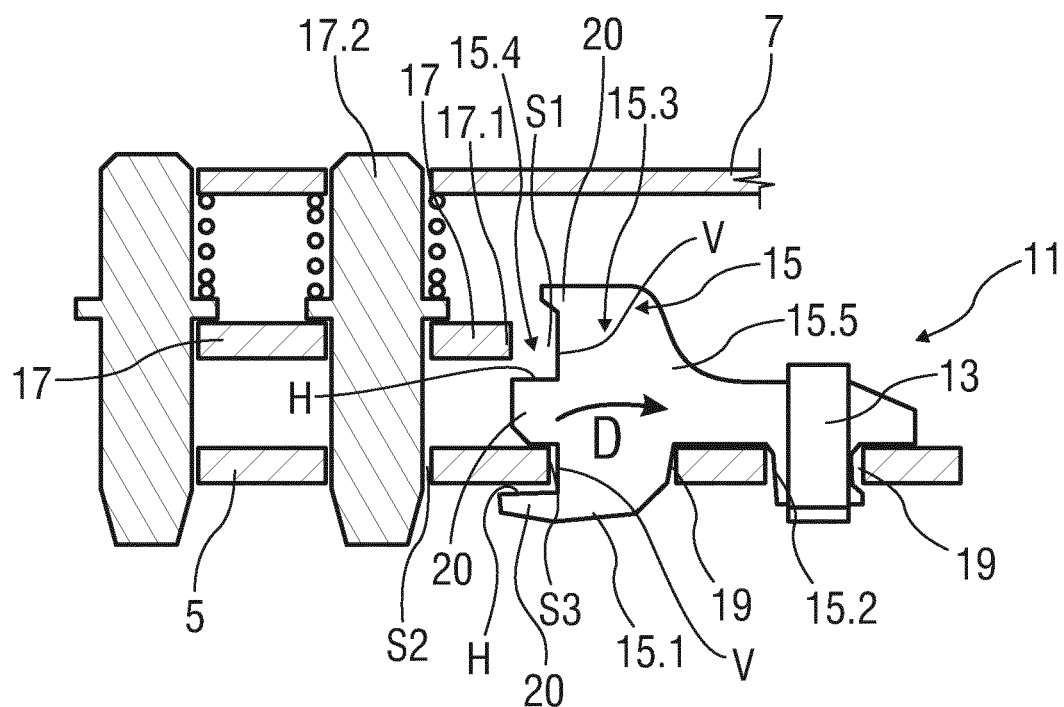
FIG. 3 is a schematic longitudinal sectional view of an exemplary embodiment of a pair of rails with a stop positioned in a lower rail.

FIG. 3 shows in longitudinal section the pair of rails 3 with the stop 11 positioned in the lower rail 5 and the stop element 15 in detail. The stop element 15 is configured such that it is positionable variably on the lower rail 5 and is automatically fixable.

For this purpose, the stop element 15 has at least two protruding holding elements 15.1, 15.2, of which one is angled in a hook shaped manner and the other is of pin shaped design.

By this means, the stop element 15 is positionable and fixable in the lower rail 5 by means of a positioning and fixing connection, in particular is pluggable in said rail in an automatically fixing manner.

For the optional or additional fixing of the automatically fixable plug in connection of the stop 11, in particular the pin shaped holding element 15.2 thereof, the flexible fixing element 13 is provided. The flexible fixing element 13 is configured, for example, as a holding spring. The holding spring is, for example, an omega spring.

In one possible embodiment, the pin shaped holding element 15.2 can be is configured such that the latter fixes itself with a form fit and/or force fit connection. For this purpose, the pin shaped holding element 15.2 is formed, for example, from a flexible material or is of flexible and profiled design at least on an outer side, and therefore a plug in and clamping connection of the stop 11 on the pair of rails 3, in particular on the lower rail 5, is made possible.

In other words: the variably positionable stop 11 is variably positionable and automatically fixable as an additional geometrical component or a flexible end stop in one of the rails 5 or 7 of the pair of rails 3. The stop 11 can fix itself here or can be held and fixed on the pair of rails 3 by additional connecting means, such as the flexible fixing element 13.

The flexible fixing element 13, for example a clamping spring, is pluggable onto the stop 11 vertically from above or from below in the region of the pin shaped holding element 15.2 and is fixable, in particular clampable, to the lower rail 5.

By this means, it is possible on existing rail profiles with fixed rail stop ends to limit the existing travel distance by retrospective positioning and fixing of the stop 11 according to the invention. The stop 11 here can shorten the travel distance forward or rearward by corresponding variable positioning on one of the rails 5 or 7.

The stop 11 is moreover formed, at least in the stop region 15.3, of a solid material, in particular of metal. In the region of the plug in connection, the stop can be formed from a flexible material. The stop 11 is designed and shaped such that, in the event of the incursion of a load, for example by means of a pin guiding plate 17, the stop region 15.3 can be used as an end stopper and therefore as shortening of the travel distance.

The stop region 15.3 has a stop surface 15.4. Furthermore, the stop surface 15.4 can be of profiled design on the end side, and therefore vertical contact surfaces V and horizontal contact surfaces H are formed. For example, the stop surface 15.4 has webs 20 protruding therefrom. The webs 20 can be formed here in differing lengths in order additionally to form a plug in connection. The webs 20 can also be provided with a contour or bevel in order, for example, to assist a positioning, in particular plugging in, of the stop 11 and/or in order to improve an introduction of force in the event of the incursion of a load.

In particular, the stop surface 15.4 corresponds with an end contact surface 17.1 of the pin guiding plate 17. By this means, the forces which occur over the entire end contact surface 17.1 of the pin guiding plate 17 are distributed to the stop surface 15.4. In the event of the incursion of a load onto the stop surface 15.4 by means of the pin guiding plate 17, a torque D arises, initiated at contact points S1 by the profiling of the end contact surface 17.1 of the pin guiding plate 17.

Figure 4:
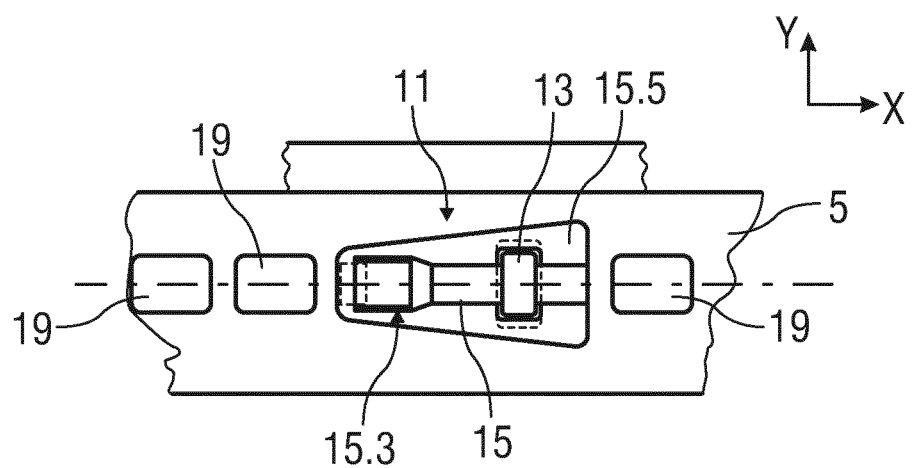
FIG. 4 is a schematic top view an exemplary embodiment of a stop positioned in a lower rail.

FIG. 4 shows the stop 11 in top view. The stop 11 here has increased dimensions away from the end side stop surface 15.4.

The stop 11 absorbs the torque D, which acts in the event of the incursion of a load, in the lower rail 5 by means of the front holding element 15.1, for example a front hook, and a rear large receiving surface 15.5 and acts as an end stop and permits an improved introduction of force.

In addition, as shown in FIG. 3, in the event of a load when the torque D occurs, a pin 17.2 of the pin guiding plate 17 acts directly on a further contact point S2 in the lower rail 5. Therefore, in the event of a load, the torque D entering via the lower rail 5 at at least one further contact point S2 additionally acts on the stop 11 at the contact point S3 and therefore supports the vertical stop surface 15.4 in the region of the contact point S1.

The torque D additionally acts in the region of the two holding elements 15.1, 15.2 which are held on the lower rail 5 with a form fit connection and are positioned and held in fixing openings 19, for example punched holes, in the lower rail 5 in order, in the event of a load, to serve for absorbing the load.

Furthermore, the stop 11, in particular the stop region 15.3, has an increasing height in the direction of the end side stop surface 15.4.

Figure 5:
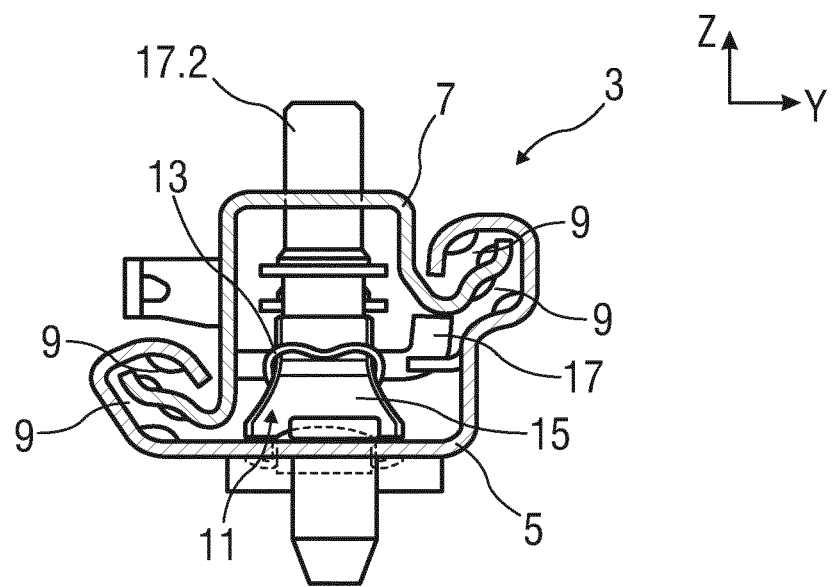
FIG. 5 is a schematic cross sectional view of a further exemplary embodiment of a pair of rails with a stop positioned in a lower rail.

FIG. 5 shows schematically in cross section a further exemplary embodiment of a pair of rails 3 with a stop 11 positioned in a lower rail 5.

Figure 6:
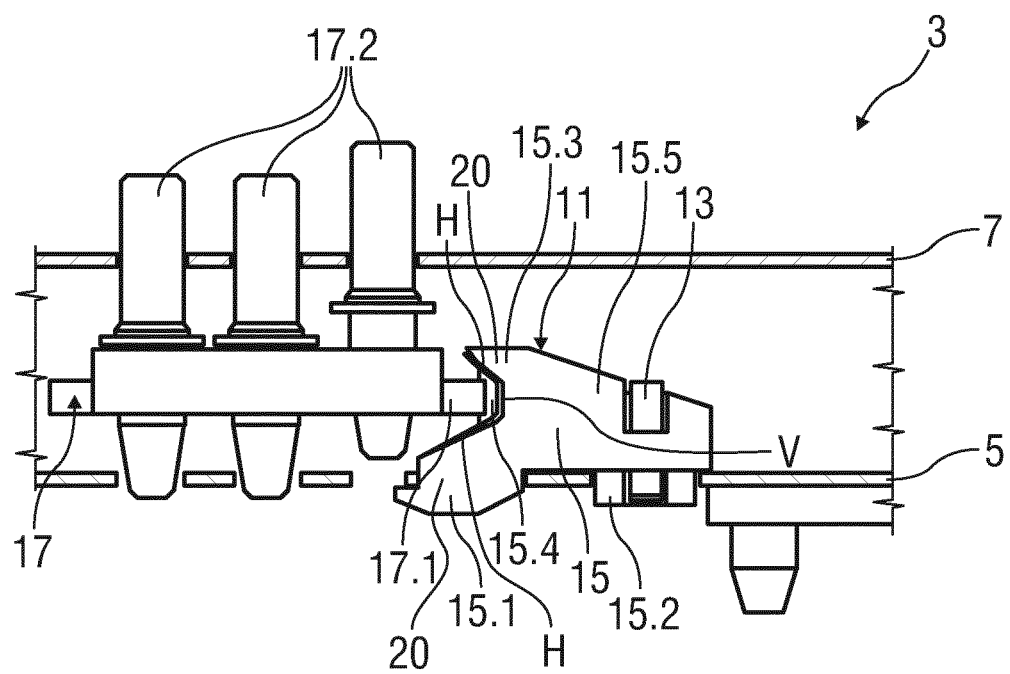
FIG. 6 is a schematic view of a further exemplary embodiment of a pair of rails with a stop positioned in a lower rail.

FIG. 6 shows schematically in longitudinal section the pair of rails 3 according to FIG. 5. The stop 11 here is configured such that it is positionable and automatically fixable variably at a holding position. The stop 11 is preferably insertable variably at a holding position in the interior of the pair of rails 3. For example, the stop 11 is positioned and automatically fixed on the lower rail 5.

The webs 20 are provided with a rising contour, in particular a rising slope, in order to assist with a positioning, in particular plugging in, of the stop 11 in the pair of rails 3 and to improve an introduction of force in the event of the incursion of a load.

The stop surface 15.4 corresponds here with an end contact surface 17.1 of the pin guiding plate 17. By this means, the forces occurring over the entire end contact surface 17.1 of the pin guiding plate 17 are distributed to the stop surface 15.4. In the event of the incursion of a load on the stop surface 15.4 by means of the pin guiding plate 17, a torque D arises, initiated at contact points S1 by the profiling of the end contact surface 17.1 of the pin guiding plate 17.

Furthermore, the stop 11 has dimensions which are increased away from the end side stop surface 15.4.

The stop 11 absorbs the torque D, which acts in the event of the incursion of a load, in the lower rail 5 by means of the front holding element 15.1, for example a front hook, and a rear large receiving surface 15.5 and acts as an end stop and permits an improved introduction of force.

In addition, in the event of a load when the torque D occurs, the pin 17.2 of the pin guiding plate 17 acts directly in the lower rail 5, and therefore, in the event of a load, the torque D entering via the lower rail 5 additionally acts on the stop 11.

Figure 7:
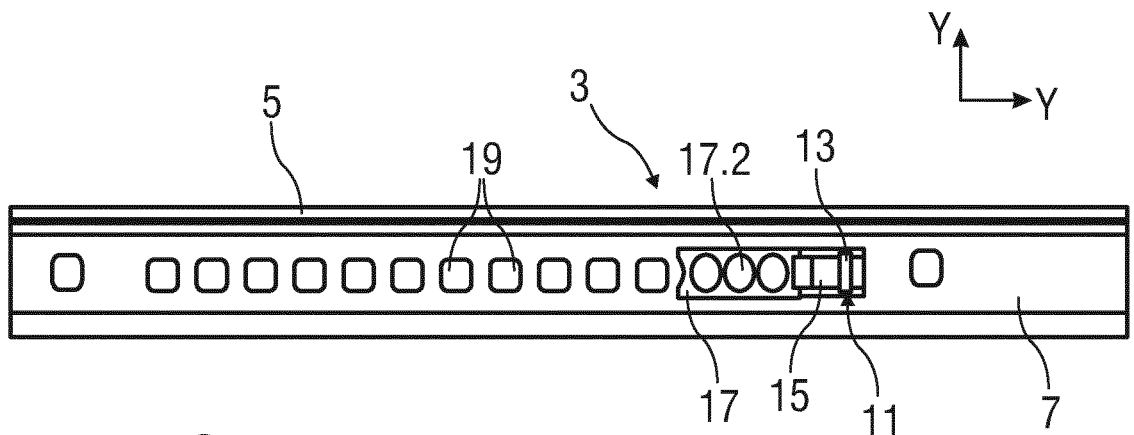
FIG. 7 is a schematic view of the further exemplary embodiment of a pair of rails with a stop positioned in a lower rail.

FIG. 7 shows the pair of rails 3 in a top view with the upper rail 7 partially cut open in order to illustrate the stop 11 fixed in the lower rail 5. The stop 11 is additionally fastened releasably here to the pair of rails 3 by means of the separate fixing element 13.

Figure 8:
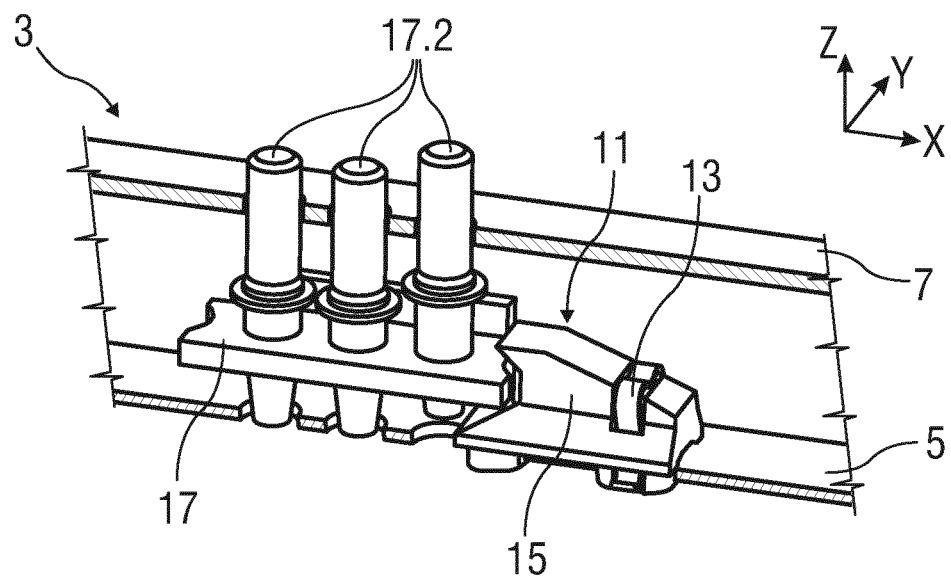
FIG. 8 is a schematic view of a further exemplary embodiment of the pair of rails with a stop positioned in a lower rail.
Figure 9:
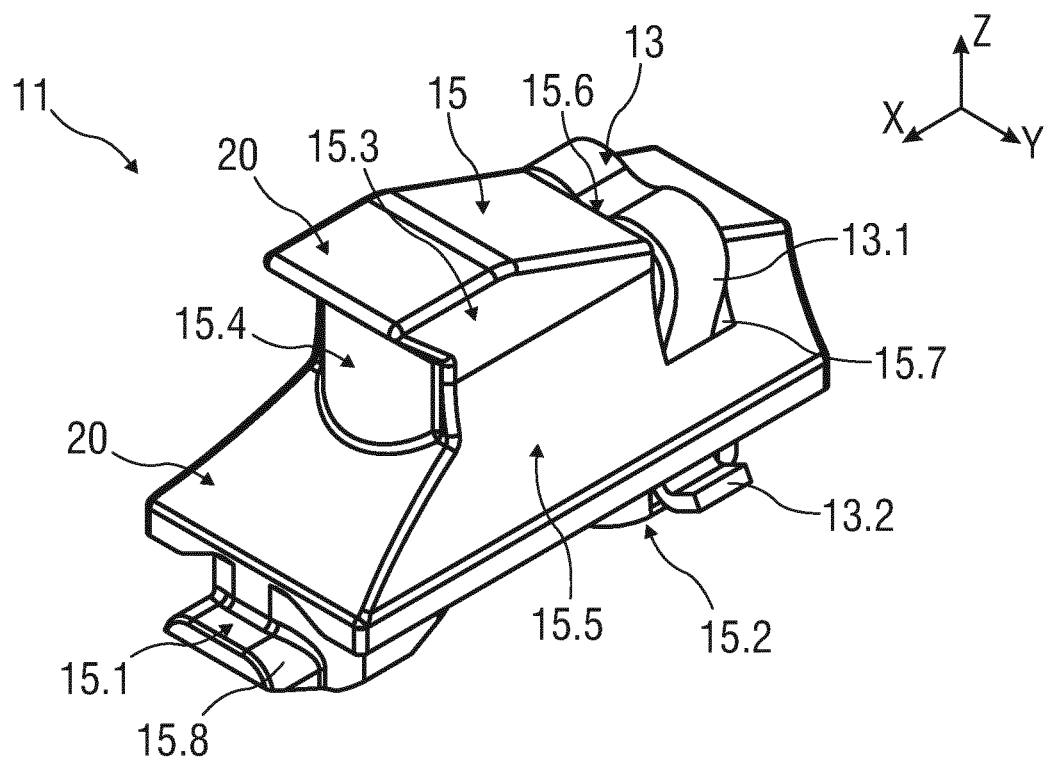
FIG. 9 is a schematic view of another exemplary embodiment of a stop with a separate fixing element.

FIG. 8 shows the pair of rails 3 in a perspective illustration, wherein the stop 11 is additionally fastened releasably to the pair of rails 3 by means of a fixing element 13 configured as an omega spring.

FIGS. 9 to 12 schematically show various illustrations of an exemplary embodiment of the stop 11 with a separate fixing element 13. The stop 11 here has a receptacle 15.6 into which the fixing element 13 is pluggable and is holdable with a form fit or force fit connection. The receptacle 15.6 comprises two recesses 15.7 in which spring arms 13.1 of the fixing element 13 are guided and held. The free ends 13.2 of the spring arms 13.1 are angled outward, and therefore said ends 13.2 in the fitted state engage in a latching manner on the pair of rails 3.

The fixing element 13 is configured such that said fixing element holds the stop element 15 in a reversibly releasable manner on the pair of rails 3.

The front holding element 15.1 of the stop element 15 is of hook shaped design and comprises a hook 15.8 protruding forward from the stop surface 15.4. By means of the hook 15.8, the stop element 15 can be pre positioned and held with a form fit and/or force fit connection on the pair of rails 3.

Depending on the arrangement of the stop 11 on the pair of rails 3, and depending on the forces acting on said holding position when one of the rails 5, 7 strikes against the stop 11 during a longitudinal adjustment, the additional fixing element 13 can be omitted or provided. For example, the fixing element 13 can be omitted in the case of a stop 11 which is provided as a front end stop. By contrast, in the case of a stop 11 provided as a rear end stop, said stop is additionally held on the pair of rails 3, in particular on the lower rail 5, by means of the fixing element 13.

Figure 10:
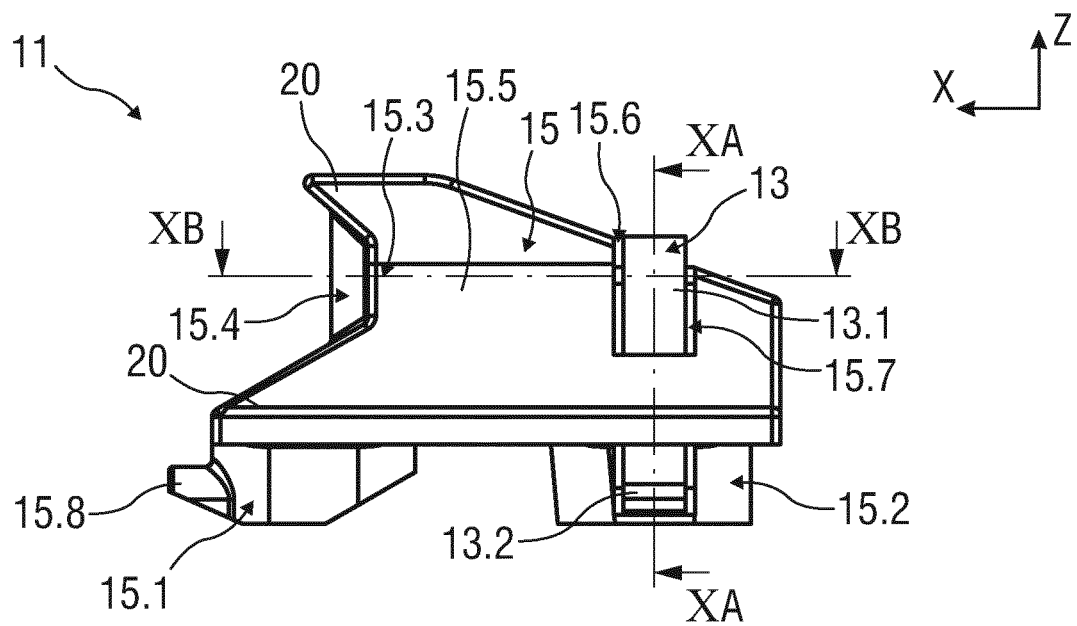
FIG. 10 is a schematic view of the other exemplary embodiment of a stop with a separate fixing element.
Figure 10A:
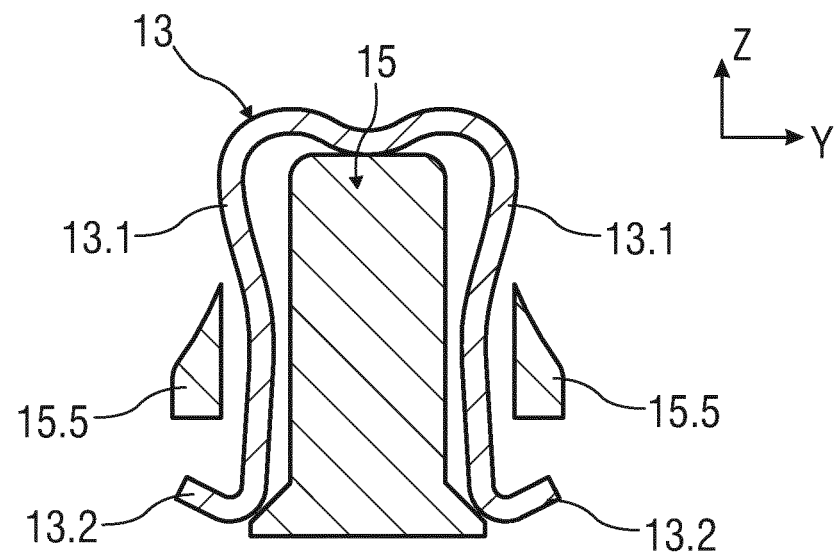
FIG. 10A is a schematic sectional view of the other exemplary embodiment of a stop with a separate fixing element.

FIG. 10A shows the stop 11 with the fixing element 13, which is arranged in the receptacle 15.6, in a sectional illustration. In this embodiment, the fixing element 13 is configured as an omega spring. For example, the fixing element 13 can be a metal spring and can be of U shaped design with lateral spring arms 13.1.

Figure 10B:
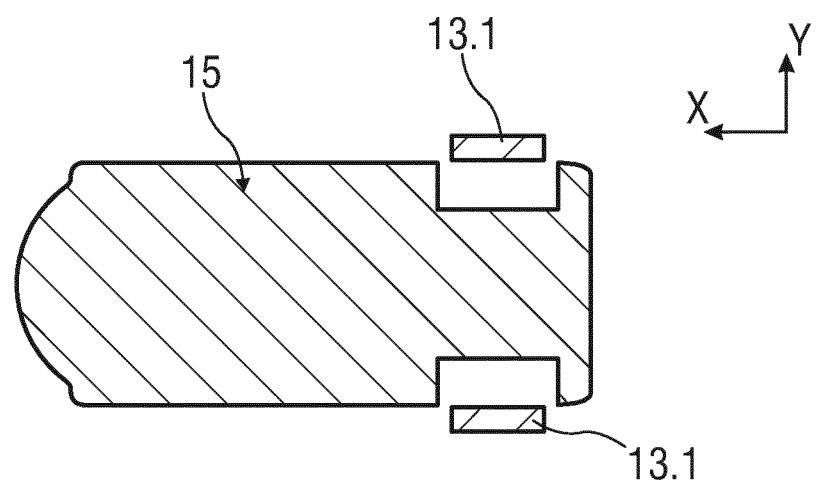
FIG. 10B is a schematic sectional view of the other exemplary embodiment of a stop with a separate fixing element.

FIG. 10B shows, in the section XB, the stop 11 with the stop element 15 and the lateral spring arms 13.1 of the fixing element.

Figure 11:
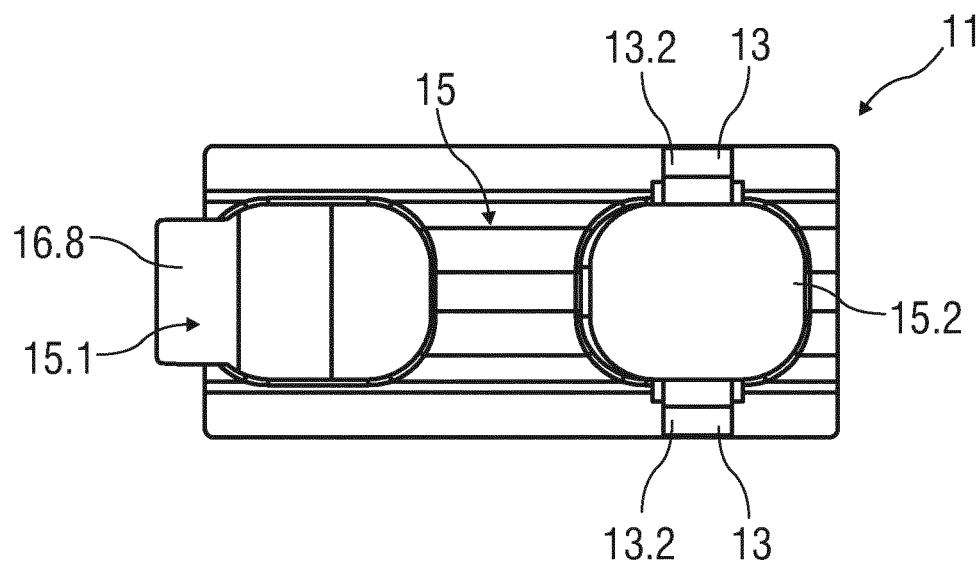
FIG. 11 is a schematic view of the other exemplary embodiment of a stop with a separate fixing element.

FIG. 11 shows the stop 11 in a view from below with the stop element 15 and the forwardly protruding hook 15.8 for positioning and fastening the stop 11 itself and with the further pin shaped holding element 15.2 of the stop 11 and the free ends 13.2 of the additional fixing element 13, said free ends protruding laterally from the holding element, for the additional fastening of the stop 11 to the pair of rails 3, in particular to the lower rail 5.

Figure 12:
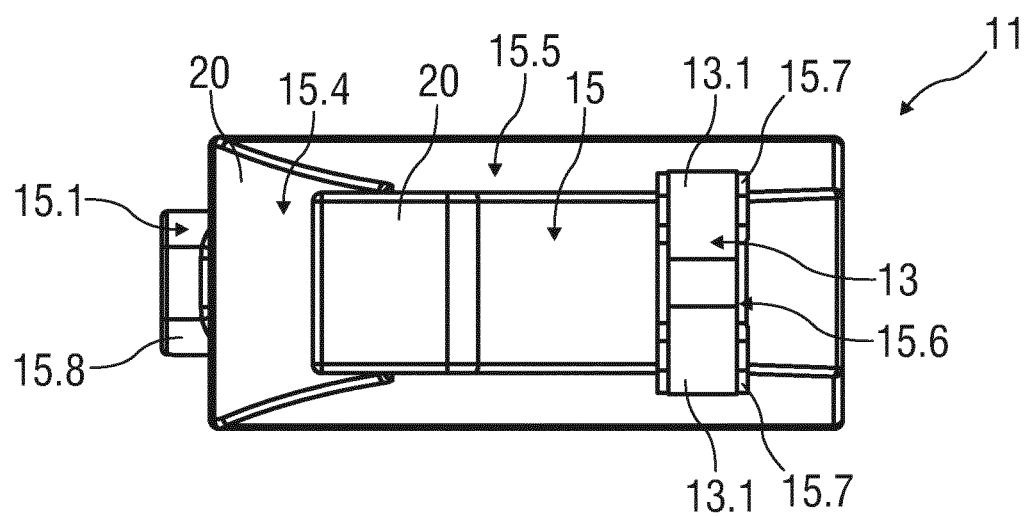
FIG. 12 is a schematic view of the other exemplary embodiment of a stop with a separate fixing element.
Figure 13:
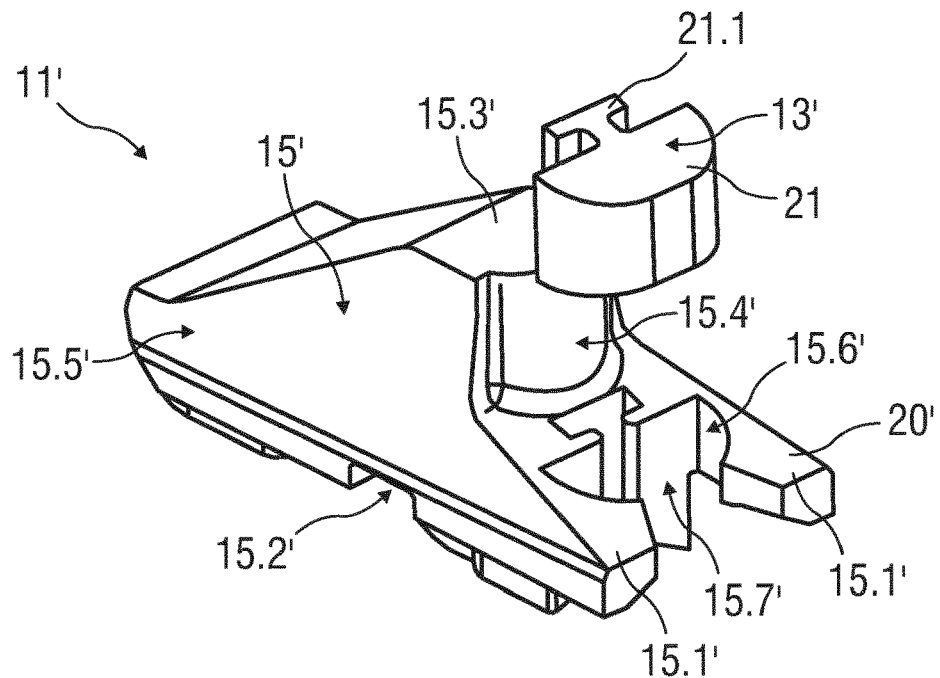
FIG. 13 is a schematic perspective view of an alternative exemplary embodiment of a stop with a separate fixing element.
Figure 14:
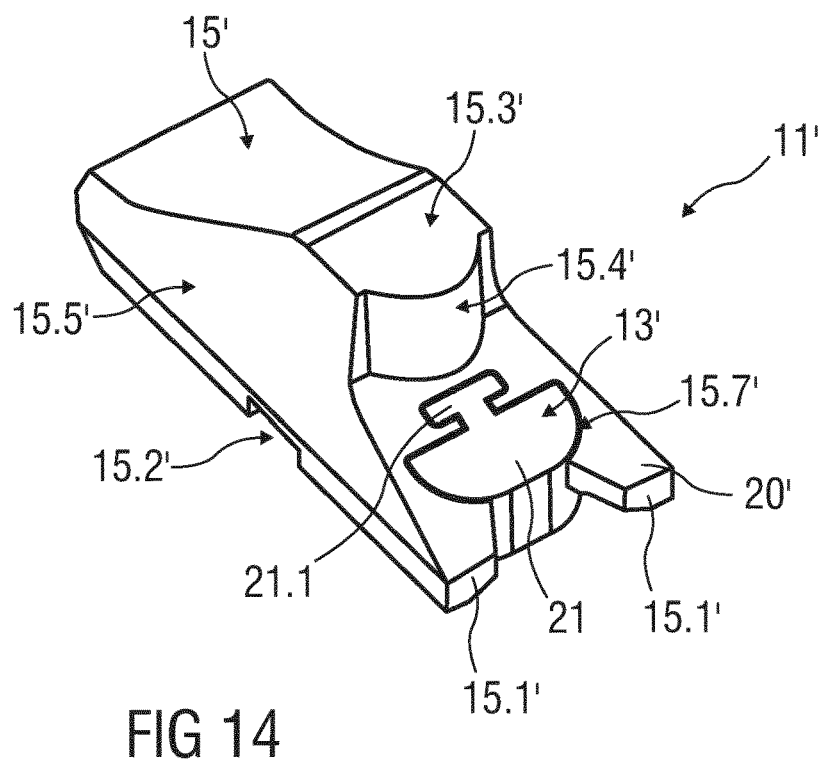
FIG. 14 is a schematic perspective view of the alternative exemplary embodiment of a stop with a separate fixing element.

FIG. 12 shows the stop 11 in a top view from above with the additional fixing element 13 which is arranged in the receptacle 15.6, wherein the spring arms 13.1 are guided and held in the recesses 15.7.

FIGS. 13 to 18 show schematically different illustrations of an alternative exemplary embodiment of a stop 11' with a separate fixing element 13'.

In the alternative embodiment, the fixing element 13' is configured as a plug in element 21 which is arrangeable in the stop element 15' with a form fit and/or force fit connection.

In this simple embodiment, the fixing element 13' can be a plastics part, in particular an injection molded part. For example, the fixing element 13' can be formed from a thermoplastic elastomer, in particular polypropylene or polyethylene. The stop element 15' and the fixing element 13' can be formed here from the same plastics material. Alternatively, the stop element 15' can be formed from a firmer plastics material than the fixing element 13'.

Furthermore, the fixing element 13' is arrangeable irreversibly on or in the stop element 15'. For this purpose, the stop element 15' has, for example, a receptacle 15.6'. The receptacle 15.6' is configured as a recess 15.7', the contour of which corresponds with the contour of the fixing element 13'. For example, the fixing element 13' is configured as a plug in element 21 with a web 21.1 protruding therefrom, in particular a T shaped web 21.1. Corresponding to said T shaped web 21.1, the receptacle 15.6' has a correspondingly T shaped recess 15.7'.

The fixing element 13' is configured such that said fixing element is arrangeable irreversibly in the stop element 15', in particular in the recess 15.7'.

Figure 15:
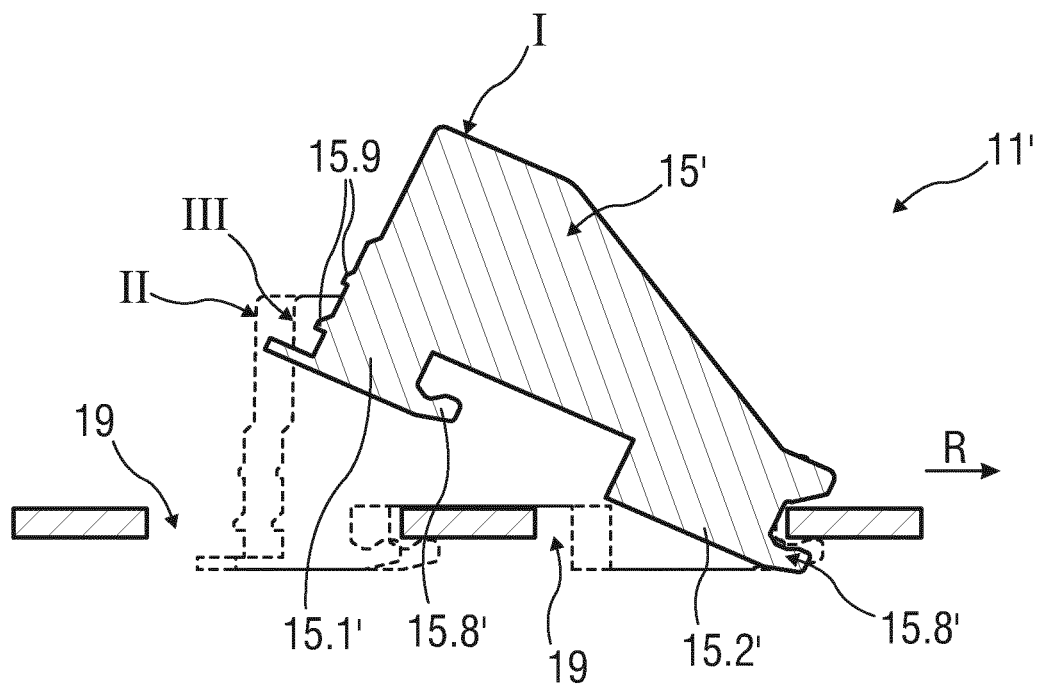
FIG. 15 is a schematic sectional view of the alternative exemplary embodiment of a stop with a separate fixing element.

FIG. 15 shows the insertion of the alternative stop 11' into a pair of rails 3', in particular into the lower rail 5'. First of all here the stop element 15', as shown in a position I, is pluggable with the rear holding element 15.2' into an opening 19' of the lower rail 5'. The holding element 15.2' has a protruding hook 15.8' which engages under the lower rail 5' after displacement from an intermediate position II in the longitudinal direction R into a holding position III.

The holding element 15.1' also has a protruding hook 15.8' which, in the displaced end state in the holding position III of the stop 11', holds said stop 11' on the lower rail 5'.

Figure 16:
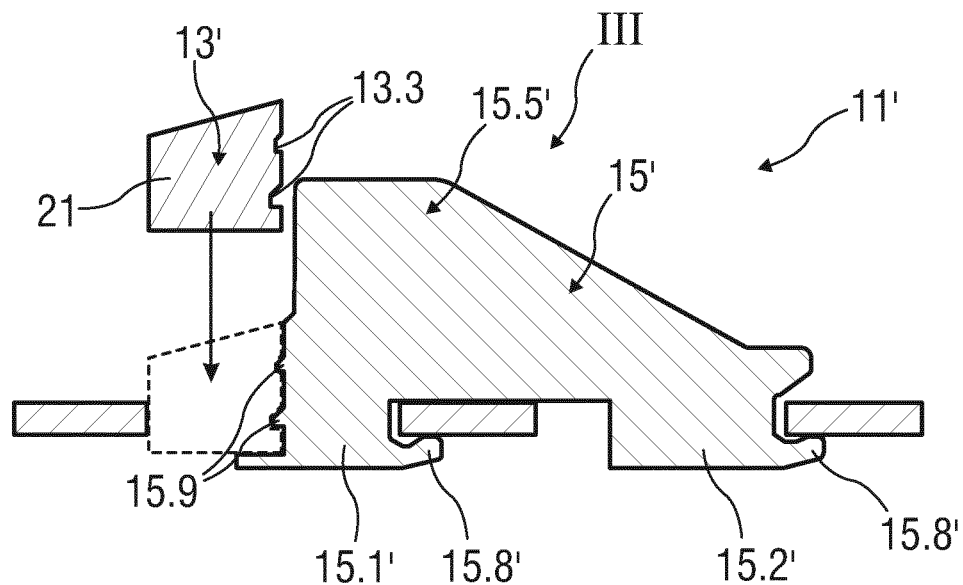
FIG. 16 is a schematic sectional view of the alternative exemplary embodiment of a stop with a separate fixing element.

FIG. 16 shows the stop 11' in the holding position III.

When the stop 11' is used, for example, as an end stop, the stop 11' can additionally be provided with a fixing element 13'.

The fixing element 13' in the present case is a plug in element 21 which, after the stop 11' is held in the holding position III on the lower rail 5', is plugged from above into the stop 11', in particular into the receptacle 15.6' thereof. The plug in element 21 is arranged and held here both in the receptacle 15.6' and in the opening 19' of the lower rail 5' with a form fit and/or force fit connection.

The fixing element 13' is configured such that it is held irreversibly in the receptacle 15.6' and in the opening 19'. For example, the fixing element 13' for this purpose has at least one depression 13.3 and the stop element 15' correspondingly has at least one protrusion 15.9, or vice versa.

In particular, the fixing element 13' has, on the outer side, in particular on the end side, in particular a notch, score or groove as the depression 13.3. The stop element 15', in particular the recess 15.7' of the stop element 15', correspondingly has the at least one protrusion 15.9, for example a rib, a web or a saw tooth rib. Alternatively, the fixing element 13' can have a protrusion and the stop element 15' can correspondingly have a depression.

The fixing element 13' can be is configured such that said fixing element is both arrangeable irreversibly in the stop element 15' and also automatically and irreversibly fixes the stop element 15' in the holding position III. By means of such a fixing element 13' which is held irreversibly in the stop element 15' and holds the stop element 15' automatically and irreversibly in the holding position III, a simple stop which can be variably positioned and fixed is provided.

Figure 17:
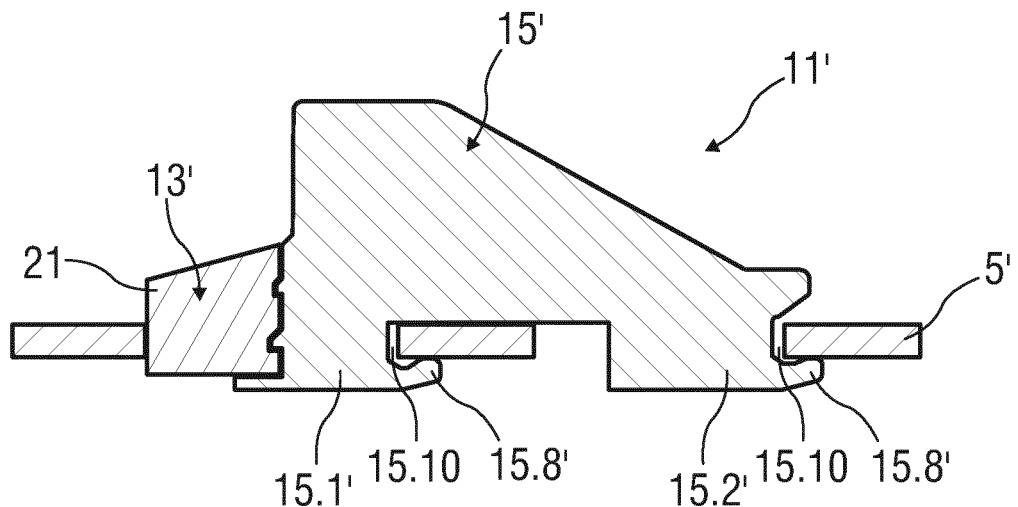
FIG. 17 is a schematic sectional view of the alternative exemplary embodiment of a stop with a separate fixing element.

FIG. 17 shows the stop 11' in the holding position III with the fixing element 13' inserted and irreversibly fastened. The stop element 15' engages here around the lower rail 5' in a U shaped manner. For this purpose, the stop element 15' has the protruding hooks 15.8' on the holding elements 15.1', 15.2'. By means of additional cutouts 15.10 in the holding elements 15.1', 15.2', the stop element 15' engages around the lower rail 5' in the openings 19' in a U shaped manner.

Figure 18:
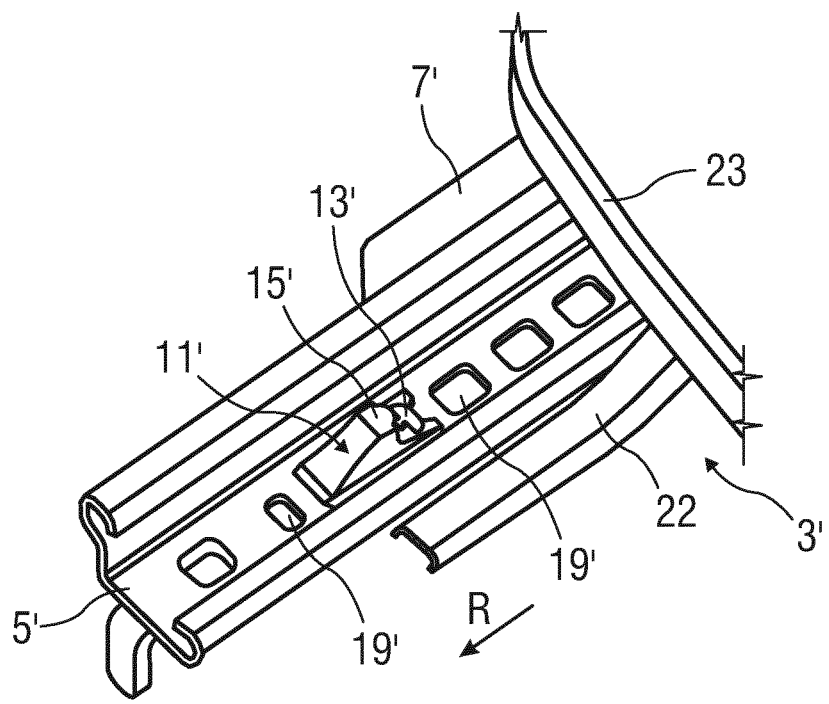
FIG. 18 is a schematic perspective view of the alternative exemplary embodiment of a stop with a separate fixing element.

FIG. 18 shows the stop 11' as a front end stop which is inserted and fixed in one of the openings 19'. By means of an actuating lever 22, a seat 23 can be stopped at the stop 11' on being moved forward in the longitudinal direction R.

While specific embodiments of the invention have been shown and described in detail to illustrate the application of the principles of the invention, it will be understood that the invention may be embodied otherwise without departing from such principles.

What is claimed is:

1. An end stop for a longitudinal adjustment device, the end stop comprising:
   a stop element which is variably positionable and is configured to be automatically fixed in a holding position;
   wherein the stop element is configured as a combined positioning and fixing element and comprising at least two holding elements for pre-positioning and automatic pre-fixing in the holding position;
   wherein a separate fixing element is provided to additionally fix the stop element in the holding position;
   wherein one of the holding elements is pin shaped;
   wherein the stop element comprises a receptacle having two recesses, each of the recesses forms a portion of an outer surface of the pin shaped holding element;
   wherein the separate fixing element is configured as a holding spring which is inserted into the receptacle from a top side of the stop element;
   wherein spring arms of the separate fixing element are plugged into the recesses and disposed adjacent the outer surface of the pin shaped holding element in the holding position;
   wherein each of the spring arms comprises a free end protruding laterally away from the pin shaped holding element; and
   wherein the free end engages the longitudinal adjustment device for additional fastening of the stop element to the longitudinal adjustment device.

2. The end stop of claim 1, wherein another one of the at least two holding elements is angled with a hook shape.

3. The end stop of claim 2, wherein at least one of the holding elements is a flexible holding element with a flexible configuration such that a plug in and clamping connection is made possible.

4. The end stop of claim 3, wherein the flexible holding element is formed from a flexible material.

5. The end stop of claim 3, wherein the flexible holding element is of flexible configuration at least on an outer side.

6. The end stop of claim 2, wherein at least one of the holding elements is of profiled configuration on an outer side.

7. The end stop of claim 1, wherein the fixing element is arrangeable with a form fit connection or a force fit connection or both a force fit and a form fit connection on the stop element.

8. A longitudinally adjustable rail arrangement, comprising:
   a pair of rails;
   an end stop configured to cooperate with at least one of the rails, the end stop comprising a single-piece stop element which is variably positionable and is configured to be automatically fixed in a holding position on at least one of the rails;
   wherein the stop element is configured as a combined positioning and fixing element and comprises at least two holding elements for pre-positioning and automatic pre-fixing in the holding position;
   wherein a separate fixing element is provided to additionally fix the stop element in the holding position;
   wherein one of the holding elements is pin shaped;
   wherein the stop element comprises a receptacle having two recesses, each of the recesses forms a portion of an outer surface of the pin shaped holding element;
   wherein the separate fixing element is configured as a holding spring which is inserted into the receptacle from a top side of the stop element;
   wherein spring arms of the separate fixing element are plugged into the recesses and disposed adjacent the outer surface of the pin shaped holding element in the holding position;
   wherein each of the spring arms comprises a free end protruding laterally away from the pin shaped holding element; and
   wherein the free end engages at least one of the rails for additional fastening of the stop element to the at least one of the rails.

9. The longitudinally adjustable rail arrangement of claim 8, wherein the stop is arrangeable in a positionable and automatically fixable manner on a rail of the pair of rails.

10. The longitudinally adjustable rail arrangement of claim 9, wherein the stop is releasably arrangeable in an interior space between the rails of the pair of rails.

11. The longitudinally adjustable rail arrangement of claim 10, wherein another one of the two holding elements of the stop element is angled with a hook shape, and wherein at least one of the holding elements comprises a flexible holding element formed of a flexible material.

12. An end stop for a longitudinal adjustment device, the end stop comprising:
   a stop element which is variably positionable and is configured to be fixed in a holding position, the stop element comprising at least two protruding holding elements, one of the at least two protruding holding elements being configured to be inserted in a first opening of a rail, another one of the at least two protruding holding elements being configured to be inserted in a second opening of the rail to position and fix the stop element to the rail;
   a fixing element, at least one portion of the fixing element being configured to extend through one of the first opening and the second opening to additionally fix the stop element in the holding position;
   wherein the fixing element is a separate component from the at least two protruding holding elements;
   wherein one of the protruding holding elements is pin shaped;

wherein the stop element comprises a receptacle having two recesses, each of the recesses forms a portion of an outer surface of the pin shaped holding element;

wherein the separate fixing element is configured as a holding spring which is inserted into the receptacle from a top side of the stop element;

wherein spring arms of the separate fixing element are plugged into the recesses and disposed adjacent the outer surface of the pin shaped holding element in the holding position;

wherein each of the spring arms comprises a free end protruding laterally away from the pin shaped protruding holding element; and wherein the free end engages the rail for additional fastening of the stop element to the rail.

13. The end stop of claim 12, wherein at least a portion of the fixing element is configured to extend through a first area of the one of the first opening and the second opening, one of the at least two protruding holding elements being configured to extend through a second area of the one of the first opening and the second opening, the first area being different from the second area.

* * * * *